(12) United States Patent
Seo et al.

(10) Patent No.: US 11,263,790 B2
(45) Date of Patent: Mar. 1, 2022

(54) METHOD FOR CORRECTING IMAGE PROCESSING REGION CORRESPONDING TO SKIN AND ELECTRONIC DEVICE

(71) Applicant: Samsung Electronics Co., Ltd., Suwon-si (KR)

(72) Inventors: Ja Won Seo, Suwon-si (KR); Mi Ae Kim, Suwon-si (KR); Jae Hun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 16/495,678

(22) PCT Filed: Mar. 19, 2018

(86) PCT No.: PCT/KR2018/003168
§ 371 (c)(1),
(2) Date: Sep. 19, 2019

(87) PCT Pub. No.: WO2018/174493
PCT Pub. Date: Sep. 27, 2018

(65) Prior Publication Data
US 2020/0098145 A1    Mar. 26, 2020

(30) Foreign Application Priority Data

Mar. 24, 2017 (KR) .................. 10-2017-0037913

(51) Int. Cl.
*G06T 7/90* (2017.01)
*G06T 11/00* (2006.01)
(Continued)

(52) U.S. Cl.
CPC ........ *G06T 11/001* (2013.01); *G06K 9/00281* (2013.01); *G06T 5/009* (2013.01); *G06T 5/50* (2013.01); *G06T 7/90* (2017.01)

(58) Field of Classification Search
None
See application file for complete search history.

(56) References Cited

U.S. PATENT DOCUMENTS

| 7,522,769 B2 | 4/2009 | Harville et al. |
| 8,849,025 B2* | 9/2014 | Kim ..................... G06T 11/001 382/167 |

(Continued)

FOREIGN PATENT DOCUMENTS

| JP | 2003-281535 A | 10/2003 |
| JP | 2009-200900 A | 9/2009 |

(Continued)

*Primary Examiner* — Yanna Wu
(74) *Attorney, Agent, or Firm* — Jefferson IP Law, LLP

(57) ABSTRACT

Disclosed is an electronic device. There electronic device according to an embodiment includes: a memory; and a processor electronically connected to the memory, wherein the processor can be configured to recognize a face region from an image, check first skin probability data, corresponding to a region to be corrected, on the basis of a first skin color distribution including a skin color distribution stored in association with a plurality of races, first color data of the face region, and a second color data of the region to be corrected which is in the image and includes the face region, determine a category of the face region on the basis of the first color data of the face region, and correct the color, of the region to be corrected, on the basis of the determined category and the first skin probability data. Various other embodiments understood from the specification are also possible.

15 Claims, 17 Drawing Sheets

(51) Int. Cl.
    *G06K 9/00*     (2022.01)
    *G06T 5/00*     (2006.01)
    *G06T 5/50*     (2006.01)

(56) References Cited

U.S. PATENT DOCUMENTS

| | | |
|---|---|---|
| 9,098,886 B2 | 8/2015 | Watanabe et al. |
| 9,305,359 B2 | 4/2016 | Suzuki |
| 2007/0189627 A1* | 8/2007 | Cohen ................ G06K 9/00228 382/254 |
| 2007/0229499 A1* | 10/2007 | Aoyama ............ G06K 9/00288 345/420 |
| 2014/0099027 A1* | 4/2014 | Watanabe ................ H04N 1/60 382/167 |
| 2014/0241625 A1 | 8/2014 | Suzuki |
| 2018/0042486 A1* | 2/2018 | Yoshizawa ........... A61B 5/1032 |

FOREIGN PATENT DOCUMENTS

| | | |
|---|---|---|
| JP | 2014-164656 A | 9/2014 |
| KR | 10-2013-0126386 A | 11/2013 |

* cited by examiner

METHOD FOR CORRECTING IMAGE PROCESSING REGION CORRESPONDING TO SKIN AND ELECTRONIC DEVICE

TECHNICAL FIELD

Embodiments disclosed herein relate to techniques for correcting an image processing region corresponding to skin.

BACKGROUND ART

A recent portable terminal supports not only a telephone function but also various functions which the user may perform using the portable terminal. In particular, with the development of image processing technology, the portable terminal provides various functions related to image capturing.

The portable terminal corrects a photographed image to enable a user to acquire a desired image. For example, it is possible to provide a function of brightening a skin color in a photographed image, and removing blemishes or the like. In addition, such a correction function may be provided in real time.

DISCLOSURE OF INVENTION

Technical Problem

The conventional technology corrects a skin color in the same way even when a race or a gender is different, and outputs a correction result that the user does not want.

In addition, the conventional technology corrects the color of an object other than the skin and outputs an image in which the color of a region which the user does not want is corrected.

An aspect of the disclosure is to provide an electronic device capable of correcting images in different correction schemes depending on race, gender, or age.

Another aspect of the disclosure is to provide an electronic device capable of correcting a skin region alone.

Solution to Problem

In accordance with an aspect of the disclosure, an electronic device includes a memory, and a processor electrically connected to the memory, wherein the processor may recognize a face region in an image, acquire first skin probability data corresponding to a correction target region, based on first skin color distribution including skin color distributions stored in association with a plurality of races, a first color data of the face region, and a second color data of the correction target region including the face region in the image, determine a category of the face region based on the first color data of the face region, and correct a color of the correction target region based on the determined category and the first skin probability data. In addition, various embodiments understood through the disclosure may be possible.

In accordance with another aspect of the disclosure, a method for correcting an image includes recognizing a face region in the image, identifying first skin probability data corresponding to a correction target region based on first skin color distribution including skin color distributions stored in association with a plurality of races, a first color data of the face region, and a second color data of the correction target region including the face region, determining a category of the face region based on the first color data of the face region, and correcting a color of the correction target region based on the determined category and the first skin probability data.

In accordance with another aspect of the disclosure, an electronic device includes a memory and a processor, wherein the processor may acquire an image for a plurality of external objects, recognize a face region corresponding to a face among the plurality of external objects, based on the image, determine a first probability to correspond to skin for at least a part of the face region based on a first skin color data corresponding to the face region, determine a correction target region including the face and an external object related to the face of the plurality of external objects, determine a second probability to correspond to skin for at least a part of the correction target region based on the first probability, and perform correction on the at least a part with a first level when the second probability corresponds to a first value and preform correction on the at least a part with a second level when the second probability corresponds to a second value.

Advantageous Effects of Invention

According to the embodiments disclosed herein, it is possible to use correction data corresponding to a category corresponding to a human being in an image, thus outputting a correction result which a user desires.

Further, according to the embodiments disclosed herein, it is possible to determine a category using a color of a region corresponding to skin, thus improving accuracy of determination of categories.

Further, according to the embodiments disclosed herein, it is possible to correct the color of a region corresponding to skin by calculating a skin probability for each region in an image.

In addition, various effects may be provided that are directly or indirectly understood through the disclosure.

BRIEF DESCRIPTION OF THE DRAWINGS

In the description of the drawings, the same or similar reference numerals may be used for the same or similar components.

MODE FOR THE INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
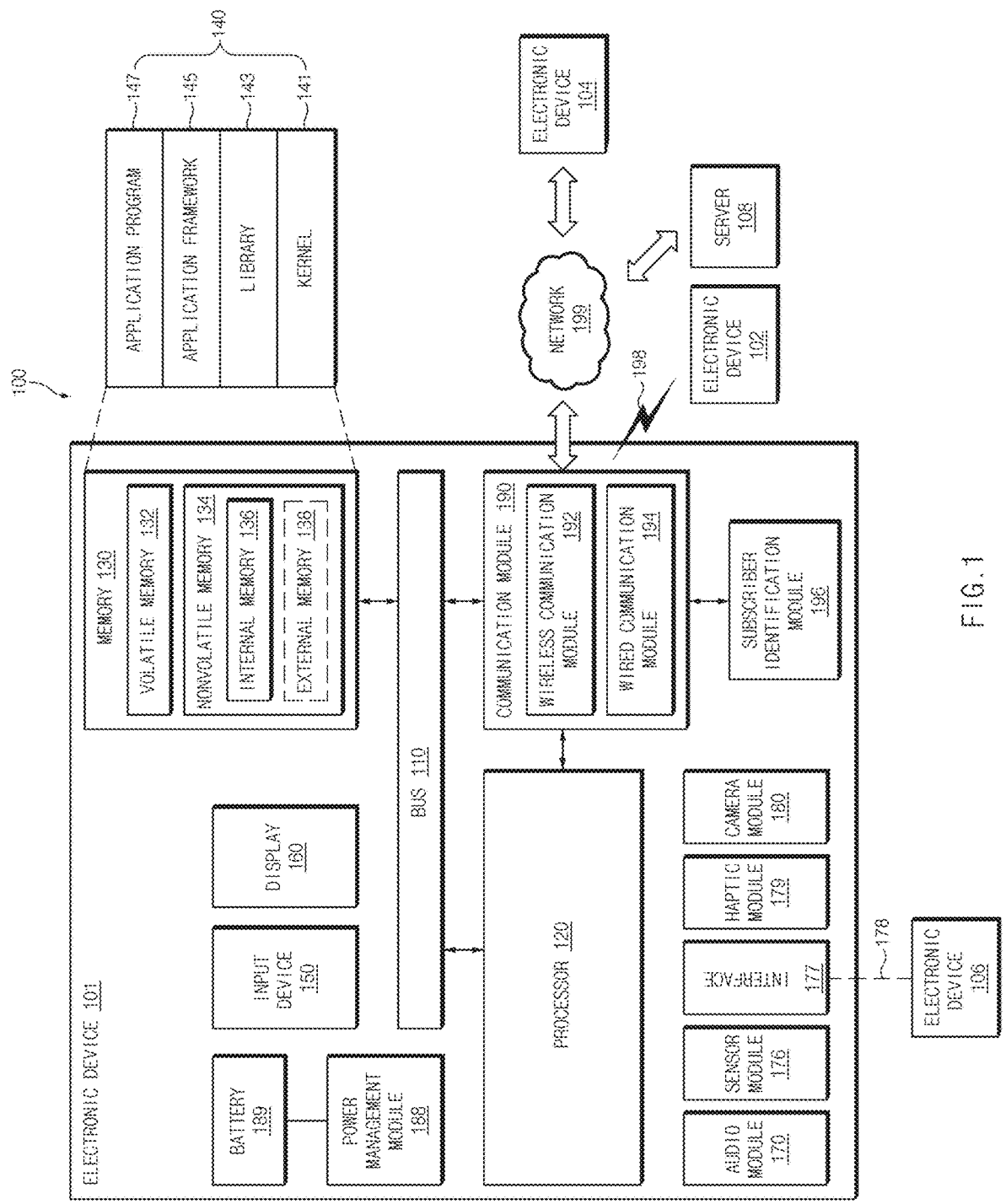
FIG. 1 illustrates a block diagram of an electronic device in a network environment, according to various embodiments.

FIG. 1 is a block diagram of an electronic device 101 in a network environment 100, according to various embodiments. An electronic device according to various embodiments disclosed herein may be various types of devices. The electronic device may include, for example, at least one of a portable communication device (e.g., a smartphone), a computer device (e.g., a personal digital assistant (PDA), a tablet PC, a laptop PC (a desktop PC, a workstation, or a server), a portable multimedia device (e.g., an e-book reader or an MP3 player), a portable medical device (e.g., a cardiac, blood glucose, blood pressure, or body temperature gauge), a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable circuit. In some embodiments, the electronic device may include at least one of, for example, a television, a digital video disk (DVD) player, an audio device, an audio accessory device (e.g., a speaker, a headphone, or a headset), a refrigerator, an air conditioner, a vacuum cleaner, an oven, a microwave, a washing machine, an air purifier, a set top box, a home automation control panel, a security control panel, a game console, an electronic dictionary, an electronic key, a camcorder, or an electronic frame.

In other embodiments, the electronic device may include at least one of a navigation device, a global navigation satellite system (GNSS), an event data recorder (EDR) (e.g., a vehicle/ship/airplane black box), an automotive infotainment device (e.g., a head-up display for a vehicle), an industrial or household robot, a drone, an automated teller machine (ATM), a point of sale (POS), a measuring instruments (e.g., water, electricity, or gas measuring instruments), or an Internet of things (IoT) device (e.g., a light bulb, a sprinkler device, a fire alarm, a temperature regulator, or a streetlight). The electronic device according to the embodiment of the disclosure is not limited to the above-described devices and may provide functions of a plurality of devices as in, for example, a smartphone having a function of measuring biometric information (e.g., heartbeat or blood sugar) of an individual. In the disclosure, the term "user" may refer to a person who uses an electronic device or a device (e.g., an artificial intelligence electronic device) that uses an electronic device.

Referring to FIG. 1, an electronic device 101 in a network environment 100 may communicate with an electronic device 102 via a short-range wireless communication 198 or with an electronic device 104 or a server 108 via a network 199. According to one embodiment, the electronic device 101 may communicate with the electronic device 104 via the server 108.

According to one embodiment, the electronic device 101 may include a bus 110, a processor 120, a memory 130, an input device 150 (e.g., a microphone or a mouse), a display device 160, an audio module 170, a sensor module 176, an interface 177, a haptic module 179, a camera module 180, a power management module 188, a battery 189, a communication module 190 and a subscriber identification module 196. In some embodiments, in the electronic device 101, at least one of the components (e.g., the display device 160 or the camera module 180) may be omitted or other components may be additionally included.

The bus 110 may include circuitry for connecting the components 120 to 190 to one another and transferring signals (e.g., control messages or data) between the components.

The processor 120 may include one or more of a central processing unit (CPU), an application processor (AP), a graphics processing unit (GPU), an image signal processor (ISP) of a camera, or a communication processor (CP). According to one embodiment, the processor 120 may be implemented with a system on chip (SoC) or a system in package (SiP). The processor 120 may control at least one other component (e.g., a hardware or software component) of the electronic device 101 connected to the processor 120 by driving an operating system or an application program, and perform various data processing and calculation. The processor 120 may load and process an instruction or data received from at least one of other components (e.g., the communication module 190) into a volatile memory 132 and store result data in a non-volatile memory 134.

The memory 130 may include the volatile memory 132 or the non-volatile memory 134. The volatile memory 132 may include, for example, a random access memory (RAM) (e.g., DRAM, SRAM, or SDRAM). The non-volatile memory 134 may include, for example, a programmable read-only memory (PROM), an one-time PROM (OTPROM), an erasable PROM (EPROM), an electrically EPROM (EEPROM), a mask ROM, a flash ROM, a flash memory, a hard disk drive, or a solid state drive (SSD). The nonvolatile memory 134 may include an internal memory 136 disposed therein or a stand-alone-type external memory 138 capable of being connected and used only when necessary, depending on a type of connection with the electronic device 101. The external memory 138 may include a flash drive such as a compact flash (CF), a secure digital (SD), a micro-SD, a mini-SD, an extreme digital (xD), a multi-media card or a memory stick. The external memory 138 may be operatively or physically connected to the electronic device 101 in a wired manner (e.g., cable or universal serial bus (USB)) or a wireless manner (e.g., Bluetooth).

The memory 130 may store, for example, instructions or data related to at least one other software component of the electronic device 101, for example, a program 140. The program 140 may include, for example, a kernel 141, a library 143, an application framework 145, or an application program (interchangeably "application") 147.

In one embodiment, the memory 130 may store an image and face region coordinates that represent the position of a face region in the image.

In one embodiment, the memory 130 may store a first skin color distribution. In one embodiment, the first skin color distribution may be stored in an external server rather than in the memory 130.

According to one embodiment, the first skin color distribution may be data represented by a YUV method or an RGB method.

According to one embodiment, the first skin color distribution may be a distribution for at least one skin color (e.g., a color component that constitutes a skin color) stored in association with a race for a plurality of races. The first skin color distribution may be composed of various types of data including statistically collected values. For example, the first skin color distribution may be expressed by a Gaussian mixture model. In one embodiment, the first skin color distribution may be used by the processor 120 to acquire second skin probability data corresponding to the face region.

In one embodiment, the memory 130 may store classification data for determining a category of the face region. For example, the classification data may include skin color distribution data for each race for determining a race category, age data according to face shapes, or gender data according to face shapes. However, the classification data is not limited to the illustrated ones, and may further include appropriate data for determining the category based on the skin color or the face shape.

In one embodiment, the memory 130 may store correction data for each category. For example, the memory 130 may store first correction data corresponding to a male category and second correction data corresponding to a female category, and the first correction data and the second correction data may be different from each other. In other words, an image corrected based on the first correction data and an image corrected based on the second correction data may be different from each other.

According to one embodiment, the correction data may include luminance correction data, texture correction data, or chrominance correction data. The correction data may be in the form of, for example, a look-up table.

The input device 150 may include a microphone, a mouse, or a keyboard. According to one embodiment, the keyboard may be connected by a physical keyboard, or may be displayed as a virtual keyboard via the display device 160.

The display device 160 may include a display, a hologram device, or a projector, and a control circuit for controlling a relevant device. The display may include, for example, a liquid crystal display (LCD), a light emitting diode (LED) display, an organic light emitting diode (OLED) display, a microelectromechanical system (MEMS) display, or an electronic paper display. According to one embodiment, the display may be implemented flexibly, transparently, or wearably. The display may include a touch circuitry capable of sensing a user's touch, gesture, proximity, or hovering input, or a pressure sensor (interchangeably a "force sensor") capable of measuring an intensity of a touch pressure. The touch circuitry or the pressure sensor may be implemented integrally with the display, or may be implemented with one or more sensors separate from the display. The hologram device may enable a stereoscopic image to be viewed in the air using the interference of light. The projector may display images by projecting light onto a screen. The screen may, for example, be located inside or outside the electronic device 101.

The audio module 170 may, for example, convert sound and electrical signals bidirectionally. According to one embodiment, the audio module 170 may acquire sound through the input device 150 (e.g., a microphone), or output sound through an output device (not shown) (e.g., a speaker or a receiver) included in the electronic device 101 or an external electronic device (e.g., the electronic device 102) (e.g., a wireless speaker or a wireless headphone) connected to the electronic device 101 or an electronic device 106 (e.g., a wired speaker or a wired headphone).

The sensor module 176 may measure or sense an operation state (e.g., power or temperature) of the interior of the electronic device 101 or an external environmental condition (e.g., altitude, humidity, or luminance) and generate an electrical signal or a data value corresponding to the measured or sensed state information. The sensor module 176 may include, for example, a gesture sensor, a gyro sensor, a barometric sensor, a magnetic sensor, an acceleration sensor, a grip sensor, a proximity sensor, a color sensor (e.g., an RGB (red, green, blue) sensor), an infrared (IR) sensor, a biological sensor (e.g., an iris sensor, a fingerprint sensor or a heartbeat rate monitoring (HRM) sensor, an electronic nose sensor, an electromyography (EMG) sensor, an electroencephalogram (EEG) sensor, an electrocardiogram (ECG) sensor), a temperature sensor, a humidity sensor, an illumination sensor, or an ultraviolet (UV) sensor. The sensor module 176 may further include a control circuit for controlling at least one or more sensors belonging thereto. In a certain embodiment, the electronic device 101 may control the sensor module 176 using the processor 120 or a processor (e.g., a sensor hub) separate from the processor 120. In the case of using a separate processor (e.g., a sensor hub), the electronic device 101 may control at least a part of the operation or state of the sensor module 176 through operation of the separate processor without waking up the processor 120 while the processor 120 is in a sleep state.

According to an embodiment, the interface 177 may include a high definition multimedia interface (HDMI), a USB, an optical interface, an RS-232 (recommended standard 232), a D-sub (D-subminiature), a Mobile High-definition Link (MHL) interface, an SD card/multi-media card (MMC) interface, or an audio interface. The connection terminal 178 may physically connect the electronic device 101 and the electronic device 106. According to one embodiment, the connection terminal 178 may include, for example, a USB connector, an SD card/MMC connector, or an audio connector (e.g., a headphone connector).

The haptic module 179 may convert an electrical signal to a mechanical stimulus (e.g., vibration or motion) or an electrical stimulus. For example, the haptic module 179 may provide the user with a stimulus related to tactile or kinesthetic sense. The haptic module 179 may include, for example, a motor, a piezoelectric element, or an electrical stimulation device.

The camera module 180 may photograph, for example, a still image and a moving image. According to one embodiment, the camera module 180 may include one or more lenses (e.g., a wide-angle lens and a telephoto lens, or a front lens and a rear lens), an image sensor, an image signal processor, or a flash (e.g., a light emitting diode or a xenon lamp, or the like).

The power management module 188, which is a module for managing power of the electronic device 101, may be configured as at least a part of, for example, a power management integrated circuit (PMIC).

The battery 189 may be recharged by an external power source, including, for example, a primary battery, a secondary battery, or a fuel cell to supply power to at least one component of the electronic device 101.

The communication module 190 may support establishment of a communication channel between the electronic device 101 and an external device (e.g., the first external electronic device 102, the second external electronic device 104, or the server 108) and performance of wired or wireless communication via the established communication channel According to one embodiment, the communication module 190 may include a wireless communication module 192 or a wired communication module 194 and may communicate with an external device via a first network 198 (e.g., a short-range communication network such as Bluetooth or infrared data association (IrDA)) or a second network 199 (e.g., a long distance communications network such as a cellular network) using a relevant communication module among them.

The wireless communication module 192 may support, for example, cellular communication, short-range wireless communication, or GNSS communication. The cellular communications may include, for example, long-term evolution (LTE), LTE Advance (LTE-A), Code Division Multiple Access (CDMA), wideband CDMA (WCDMA), universal mobile telecommunications system (UMTS) Wireless Broadband (WiBro), or Global System for Mobile Communications (GSM). The short-range wireless communication may include, for example, wireless fidelity (Wi-Fi), Wi-Fi Direct, light fidelity (Li-Fi), Bluetooth, Bluetooth low energy (BLE), Zigbee, Near Field Communication (NFC), Magnetic Secure Transmission (MST), Radio Frequency (RF), or BodyAarea Network (BAN). The GNSS may include, for example, a Global Positioning System (GPS), a Global Navigation Satellite System (Glonass), a Beidou Navigation Satellite System (Beidou), or a Galileo (European satellite-based navigation system). In the disclosure, "GPS" may be used interchangeably with "GNSS"

According to one embodiment, the wireless communication module 192 may perform identification and authentication of the electronic device 101 within the communication network, for example, using the subscriber identification module 196 when supporting cellular communication. According to one embodiment, the wireless communication module 192 may include a CP separate from the processor 120 (e.g., an AP). In such a case, the CP may perform at least some of functions associated with at least one component of the components 110 to 196 of the electronic device 101, instead of the processor 120 while the processor 120 is in an inactive (e.g., sleep) state or in cooperation with the processor 120 while the processor 120 is in an active state, for example. According to one embodiment, the wireless communication module 192 may include a plurality of communication modules that support a relevant communication method alone among a cellular communication module, a short-range wireless communication module, or a GNSS communication module.

The wired communication module 194 may include, for example, a local area network (LAN), a power line communication, or a plain old telephone service (POTS).

The first network 198 may include Wi-Fi direct or Bluetooth capable of transmitting or receiving commands or data over a direct wireless connection between the electronic device 101 and the first external electronic device 102, for example. The second network 199 may be a telecommunication network capable of transmitting or receiving a command or data between the electronic device 101 and the second external electronic device 104 (e.g., a computer network such as a local area network (LAN) or a wide area network (WAN), the Internet, or a telephone network).

According to various embodiments, the command or the data may be transmitted or received between the electronic device 101 and the second external electronic device 104 via the server 108 connected to a second network. Each of the first and second external electronic devices 102 and 104 may be the same or a different kind of device as the electronic device 101. According to various embodiments, all or some of operations performed in the electronic device 101 may be performed in another electronic device or a plurality of electronic devices (e.g., the electronic device 102 or 104, or the server 108). According to one embodiment, when the electronic device 101 needs to perform a certain function or service automatically or upon request, the electronic device 101 may request at least some of the associated functionality of another device (e.g., the electronic device 102 or 104, or the server 108), instead of or in addition to executing of the function or service. Other electronic devices (e.g., the electronic device 102 or 104, or the server 108) may execute the requested function or additional function and transfer a result thereof to the electronic device 101. The electronic device 101 may provide the requested function or service using the received result or may additionally process the received result to provide the requested function or service. To this end, for example, cloud computing, distributed computing, or client-server computing technology may be used.

Figure 2:
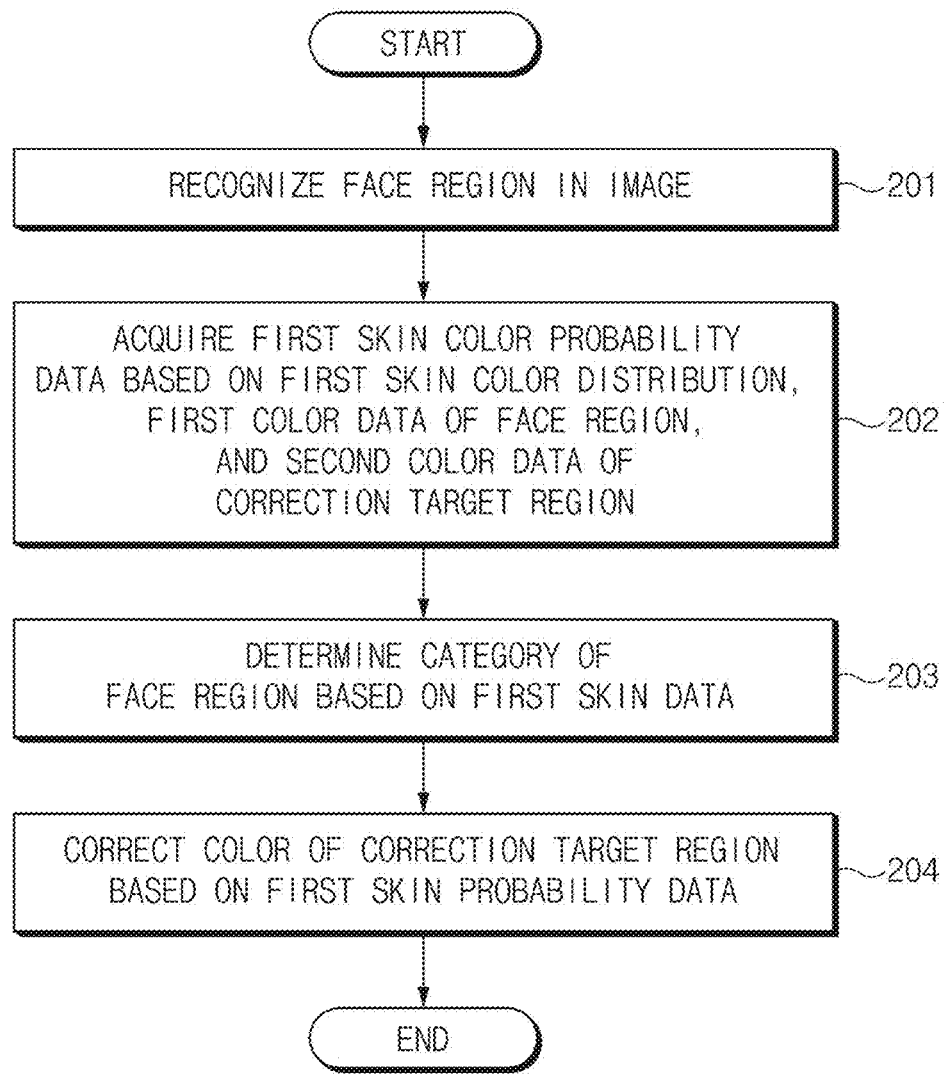
FIG. 2 is a flowchart of a method of correcting an acquired image according to an embodiment.

FIG. 2 is a flowchart illustrating a method of correcting an acquired image according to one embodiment.

In operation 201, the processor 120 of the electronic device 101 may recognize a face region in an image. The image may be an image stored in the memory 130, or an image which is acquired via the camera module 180, or is being acquired in real time. According to one embodiment, the image may include a plurality of external objects.

According to one embodiment, the processor 120 may recognize a face region in an image using algorithms such as principal component analysis (PCA), fisher discriminant analysis (FDA), or independent component analysis (ICA). In addition, the processor 120 may also use face coordinates stored in the memory 130 for the image.

In one embodiment, the processor 120 may set a correction target region that includes the recognized face region of the image based on the recognized face region. For example, when the face region is recognized as a rectangular shape, the correction target region may be a region acquired by extending the face region by the predetermined number of pixels in the up, down, left, and right directions from the face region. As another example, when the face region is recognized as a circle having a first diameter, the correction target region may be recognized as a circle having a second diameter larger than the first diameter. The above-described examples are illustrative, and the shape of the face region and the shape of the correction target region may be different from each other, and the correction target region may vary depending on the size of the image and the position of the face region in the image. According to one embodiment, the correction target region may further include a region in which the skin other than the face is exposed.

In operation 202, the processor 120 may acquire first skin probability data corresponding to the correction target region based on the first skin color distribution, a first color data of the face region, and a second color data of the correction target region. The first color data may include color data for each region of the face region. For example, the first color data may include color data for each pixel included in the face region. The first skin probability data may represent a probability that the color of each region included in the correction target region is a skin color. In other words, a probability value according to the first skin probability data of each region may represent a degree indicating how similar a color of each region is to the skin color.

In one embodiment, the processor 120 may receive a first skin color distribution from the memory 130, or receive a first skin color distribution from an external server.

In operation 203, the processor 120 may determine a category of a face region 402 based on the first color data of the face region 402. For example, the processor 120 may determine a category for at least one of race, age or gender based on the image. In other words, the processor 120 may determine at least one of white-people, yellow-people, and black-people categories corresponding to races, 10s, 20s, 30s, and 40s categories corresponding to age, or male and female categories corresponding to gender.

In one embodiment, the processor 120 may determine a category of the face region 402 using the classification data stored in the memory 130. For example, the processor 120 may determine a race having the highest degree of similarity to the first skin color distribution of the face region 402 among skin color distributions for races using skin color distribution data for each race, and determine a category corresponding to the discriminated race.

In operation 204, the processor 120 may correct the color of the correction target region based on the determined category and the first skin probability data. In one embodiment, the processor 120 may correct the color of the correction target region using the correction data for each category stored in the memory 130. According to one embodiment, the correction data for each category may include luminance correction data, texture correction data, or chrominance correction data. The correction data may be in the form of, for example, a look-up table.

In one embodiment, the processor 120 may correct at least one of luminance information, texture, or chrominance information of the correction target region. For example, the processor 120 may correct color data of each pixel of the correction target region, the color data being defined by the YUV method. The processor 120 may correct a Y value of each pixel using correction data to correct luminance information. In addition, the processor 120 may convert the Y value of each pixel to the average value of Y values of each pixel and surrounding pixels to correct texture. In addition, the processor 120 may correct the U value and the V value of each pixel using correction data to correct chrominance information.

According to one embodiment, as described above, the correction data may differ depending on categories. Therefore, when the processor 120 corrects pixels having the same Y value, U value, and V value using different correction data, correction results may be different from one another. For example, when correcting a Y value of a certain pixel using first correction data corresponding to the male category, the processor 120 may make a correction to increase the Y value of the pixel by five. As another example, when correcting the Y value using second correction data corresponding to the female category, the processor 120 may make a correction to increase the Y value of the pixel by ten.

In one embodiment, the processor 120 may determine a correction level of the correction target region based on a probability value according to the first skin probability data. According to one embodiment, the processor 120 may correct the correction target region such that a correction level, with which the correction target region is corrected, is proportional to the probability value according to the first skin probability data. For example, in a case where the processor 120 makes a correction to increase the Y value of a pixel by 5 using correction data, when the probability value according to the first skin probability data corresponding to the pixel is 0.8, the processor 120 may increase the Y value of the pixel by four. As another example, when the probability value according to the first skin probability data corresponding to the pixel is 0.4, the processor 120 may increase the Y value of the pixel by two.

Figure 3:
FIG. 3 is a diagram illustrating a face region and a correction target region displayed on an image according to an embodiment.
Figure 3:
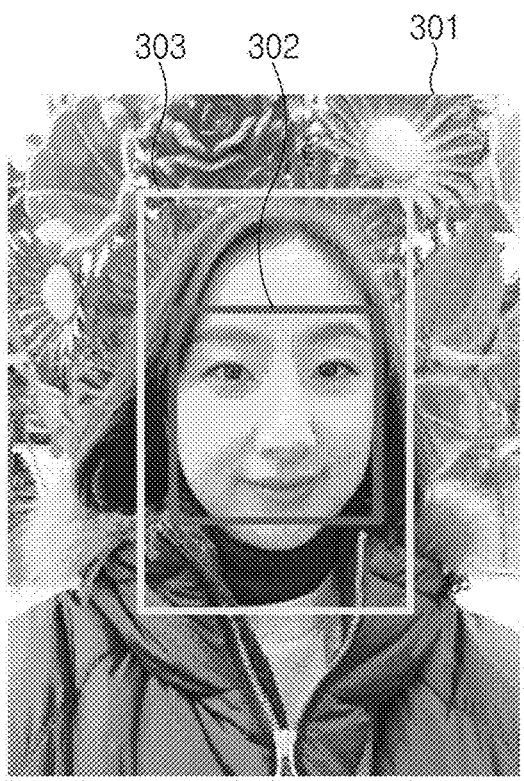

FIG. 3 is a diagram illustrating a face region and a correction target region displayed on an image according to an embodiment.

In operation 201 according to an embodiment, the processor 120 may recognize a face region 302 in an image 301 as illustrated in FIG. 3. The processor 120 may set a correction target region 303 including the recognized face region 302 and a region in which skin other than a face is exposed.

Hereinafter, an embodiment of the operation 202 will be described in detail with reference to FIGS. 4 to 10.

Figure 4:
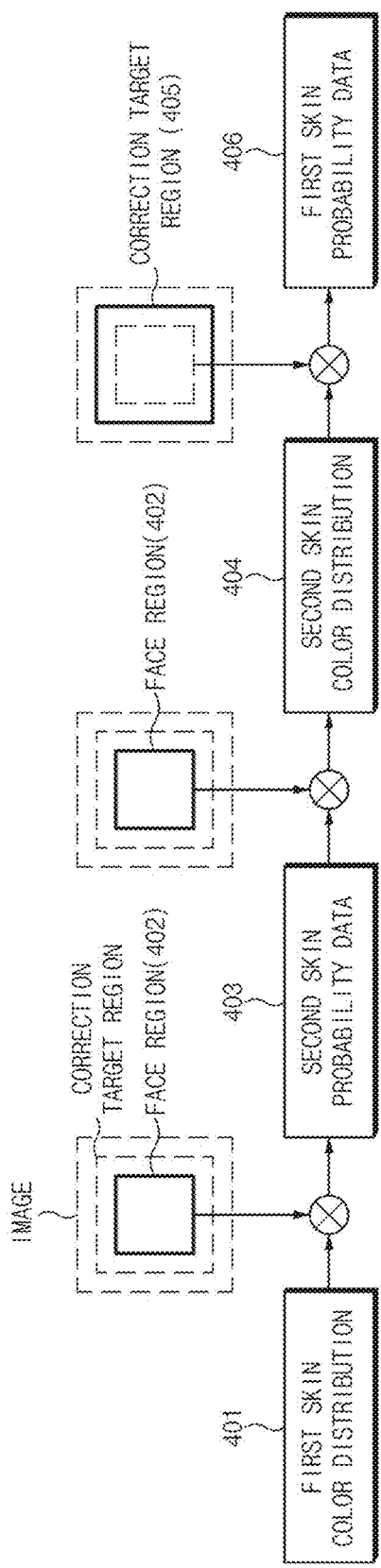
FIG. 4 illustrates a process of acquiring first skin probability data according to an embodiment.
Figure 5:
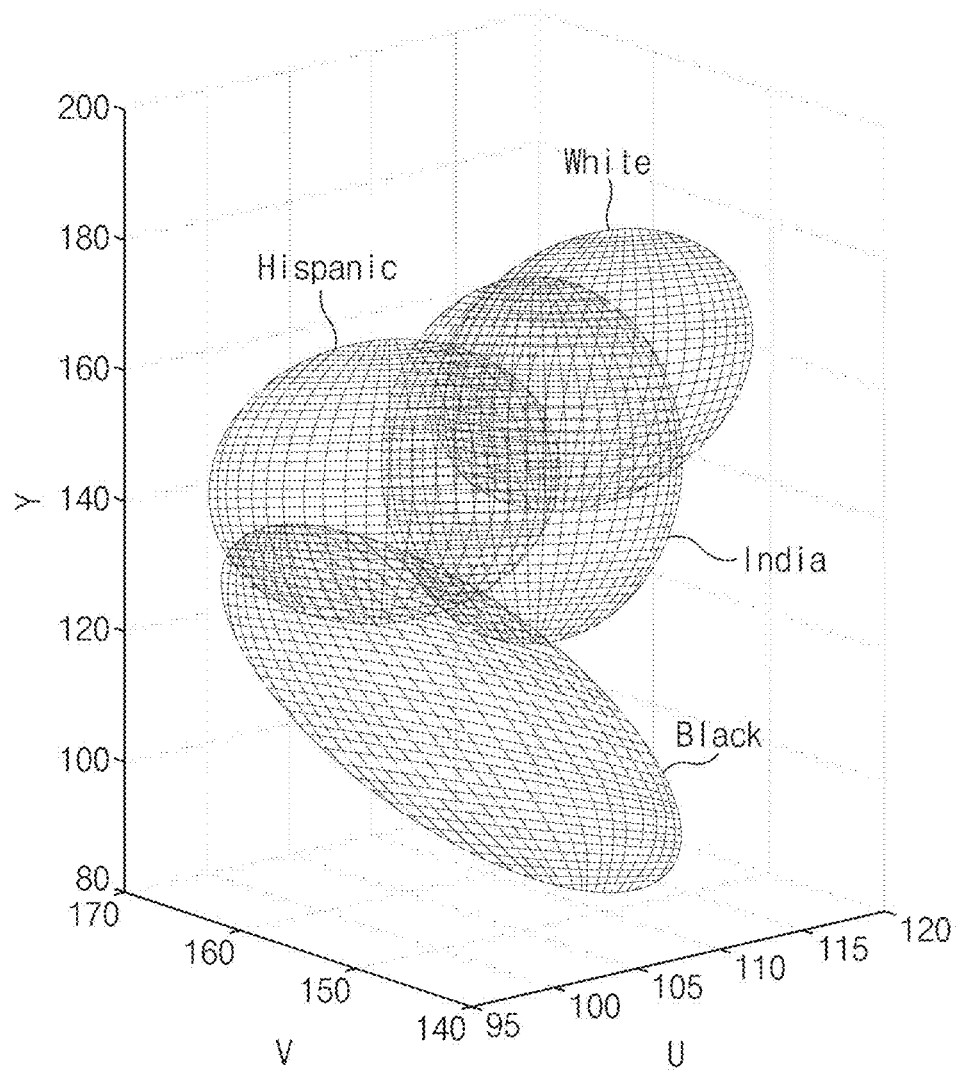
FIG. 5 is a diagram illustrating a first skin color distribution on a color space, which corresponds to a skin color distribution for each race according to an embodiment.
Figure 6:
FIG. 6 is a diagram illustrating a face region recognized from an image according to one embodiment.
Figure 7:
FIG. 7 is a map illustrating second skin probability data corresponding to a face region according to an embodiment.
Figure 8:
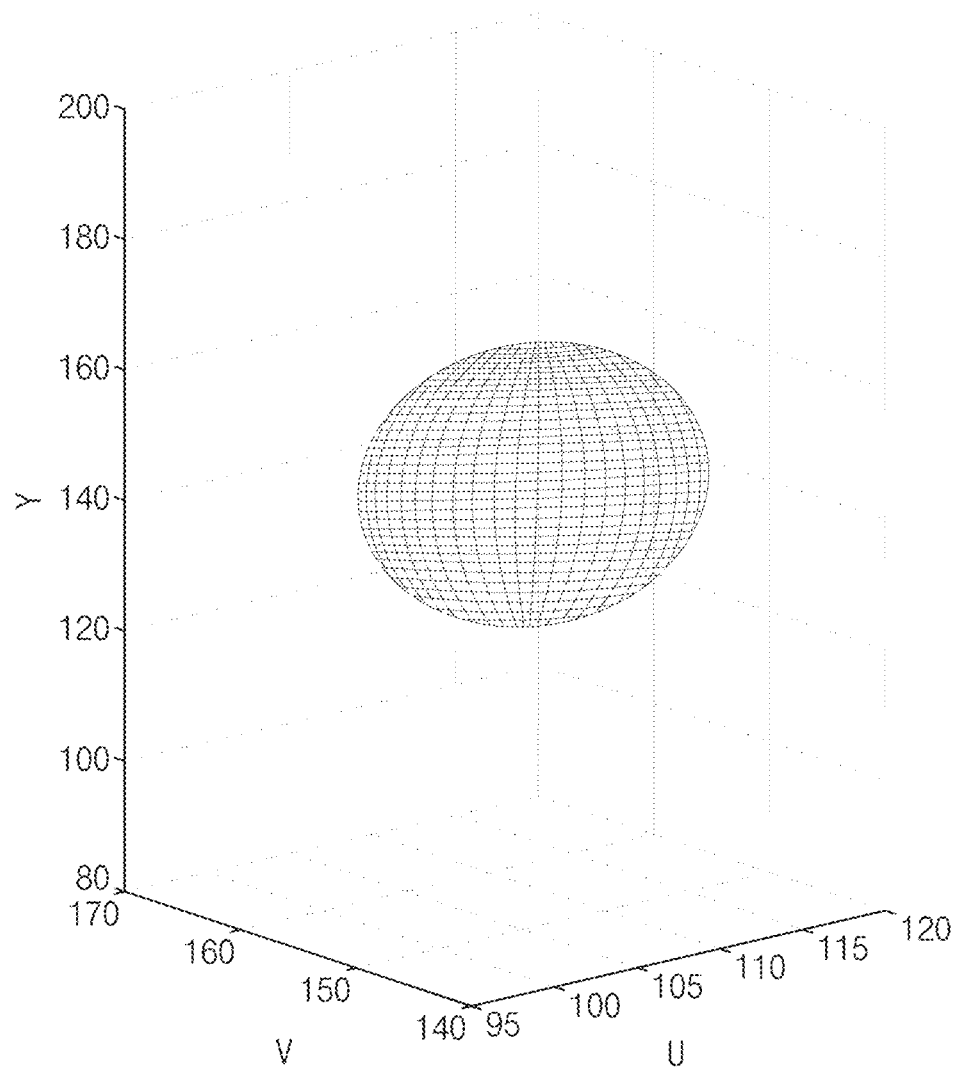
FIG. 8 is a diagram illustrating a second skin color distribution according to one embodiment on a color space.
Figure 9:
FIG. 9 is a diagram illustrating a correction target region including a face region according to an embodiment.
Figure 10:
FIG. 10 is a diagram illustrating a map of first skin probability data according to an embodiment.

FIG. 4 is a diagram illustrating a process of acquiring first skin probability data according to an embodiment. FIG. 5 is a diagram illustrating a first skin color distribution on a color space, which corresponds to a skin color distribution for each race according to an embodiment. FIG. 6 is a diagram illustrating a face region recognized in an image according to one embodiment. FIG. 7 is a diagram illustrating a map of second skin probability data corresponding to a face region according to an embodiment. FIG. 8 is a diagram illustrating a second skin color distribution according to one embodiment on a color space. FIG. 9 is a diagram illustrating a correction target region including a face region according to an embodiment. FIG. 10 is a diagram illustrating a map of first skin probability data according to an embodiment.

First, the processor 120 may acquire second skin probability data 403 corresponding to the face region 402 based on first skin color distribution 401 and first color data of the face region 402.

In one embodiment, the first skin color distribution 401 may be reference color data of skin colors. The first skin color distribution 401 may be a distribution for at least one skin color (e.g., color components that constitutes a skin color) stored in association with a race for a plurality of races. The first skin color distribution 401 may be composed of various types of data including statistically collected values. For example, the first skin color distribution 401 may be expressed by a Gaussian mixture model. In addition, the first skin color distribution 401 may be expressed by the YUV method.

In one embodiment, the first color data of the face region 402 may be color data for each region included in the face region 402 recognized in operation 201. For example, the first color data of the face region 402 may be color data of each pixel included in the face region 402. The color data included in the first color data of the face region 402 may be represented by the YUV method. In the disclosure, the YUV color coordinate system is used for the convenience of description, but RGB or other suitable color coordinate systems may be used.

In one embodiment, the second skin probability data 403 may indicate the probability that the color of each region included in the face region 402 is the skin color. In other words, as the probability value according to the second skin probability data 403 of each region increases, the degree of similarity to the first skin color distribution 401 may increase. For example, the second skin probability data 403 may include a probability value for each pixel included in the face region 402. As a Y value, a U value and a V value corresponding to the color of each pixel are closer to a Y value, a U value and a V value corresponding to the first skin color distribution 401, the probability value of each pixel may be higher.

Referring to FIGS. 5 to 7, an embodiment will be described in which the processor 120 generates the second skin probability data 403 indicating a probability value that the color of each pixel is the skin color.

The processor 120 may calculate a degree of similarity between a YUV value of the color data of each pixel included in the face region 402 as illustrated in FIG. 6 and of a YUV value of the first skin color distribution 401 as illustrated in FIG. 5 for each pixel, to acquire the second skin probability data 403. The degree of similarity may be a probability value that the color of each pixel is the skin color. FIG. 7 illustrates the second skin probability data in a map form, and in FIG. 7, each pixel may have a higher probability value as the each pixel is brighter.

In the above example, the second skin probability data is defined as a distribution of probability values per pixel, but the second skin probability data may be defined as a distribution of probability values of each region including a plurality of pixels.

Next, the processor 120 may generate a second skin color distribution 404 based on the second skin probability data 403 and the first color data of the face region 402. The second skin color distribution 404 may be used by the processor 120 to acquire first skin probability data corresponding to a correction target region.

In one embodiment, the processor 120 may generate the second skin color distribution 404 by using at least one of luminance information or chrominance information of a region of the face region 402, the region having a probability value according to the second skin probability data 403 that is equal to or greater than a predetermined value. The luminance information may be represented by Y among the Y value, the U value, and the V value, and the chrominance information may be expressed by the U value and the V value. For example, the probability value of the second skin probability data 403 may be a value between 0 and 1, and the processor 120 may generate the second skin color distribution 404 using a Y value, a U value, and a V value corresponding to a color of a pixel having a probability value of 0.7 or more. In other words, the processor 120 may generate the second skin color distribution 404 using the color data of a region including the color close to the first skin color distribution 401 that is reference skin color data. The second skin color distribution 404 may be more personalized data than the first skin color distribution 401 because the second skin color distribution 404 is generated based on the first color data of the face region 402.

Referring to FIGS. 6 and 7, an embodiment in which the processor 120 generates the second skin color distribution 404 according to the first color data of the face region 402 will be described.

The processor 120 may acquire a Y value, a U value, and a V value corresponding to the color of a pixel having the probability value of 0.7 or more among the second skin probability data 403. For example, the processor 120 may acquire a Y value, a U value, and a V value corresponding to the color of pixels included in a bright region, that is, a region having the probability value of 0.7 or more, in the map of the second skin probability data 403 as in FIG. 7 from the first color data of the face region 402 as in FIG. 6. The acquired Y value, the acquired U value, and the acquired V value corresponding to the color of the plurality of pixels may be the second skin color distribution 404 and the second skin color distribution 404 may be expressed on the YUV space as illustrated in FIG. 8.

Next, the processor 120 may acquire a first skin probability data 406 of a correction target region 405 based on the second skin color distribution 404 and the second color data of the correction target region 405.

In one embodiment, the second color data of the correction target region 405 may be color data for each region included in the correction target region 405. For example, the second color data of the correction target region 405 may be color data of each pixel included in the correction target region 405. The color data included in the second color data of the correction target region 405 may be expressed by the YUV method.

In one embodiment, the first skin probability data 406 may represent the probability that the color of each region included in the correction target region 405 is the skin color. In other words, as the probability value according to the first skin probability data 406 of each region increases, the degree of similarity to the second skin color distribution 404 may increase. For example, the first skin probability data 406 may include a probability value for each pixel included in the correction target region 405. The probability value of each pixel may increase as the Y value, the U value, and the V value corresponding to the color of each pixel are closer to the Y value, the U value, and the V value corresponding to the second skin color distribution 404. The first skin probability data 406 may be generated based on the second skin color distribution 404 unlike the second skin probability data 403. The first skin probability data 406 may have more personalized probability values than the second skin probability data 403 because the first skin probability data 406 is based on the personalized second skin color distribution 404.

Referring to FIGS. 8 to 10, an embodiment will be described in which the processor 120 generates the second skin probability data 403 representing a probability value that the color of each pixel is the skin color.

The processor 120 may calculate a degree of similarity between a YUV value of the color data of each pixel included in the face region 402 as illustrated in FIG. 9 and a YUV value of the second skin color distribution 404 as illustrated in FIG. 8 for each pixel, to acquire the first skin probability data 406. The degree of similarity may be a probability value that the color of each pixel is the skin color. FIG. 10 illustrates the first skin probability data 406 in a map form. In FIG. 10, as each pixel is brighter, a probability value increases.

Referring to FIG. 10, regions where the eyes and mouth in a face are located do not correspond to the skin and therefore, are expressed in dark color, and regions where the cheek and forehead are located correspond to the skin and therefore, are expressed in bright color.

Hereinafter, an embodiment of operation 203 will be described in detail with reference to FIG. 5.

FIG. 5 is a diagram illustrating a first skin color distribution on a color space, which corresponds to a skin color distribution for each race according to an embodiment.

The processor 120 may determine the racial skin color distribution most similar to the first skin color distribution of the face region among the skin color distributions for each race illustrated in FIG. 5 and determine a category. For example, when the skin color distribution most similar to the first skin color distribution of the face region is a skin color distribution for black people, the processor 120 may determine the category of the face region as a black category.

In one embodiment, the processor 120 may use age data according to a face shape, gender data according to the face shape, or the like and determine an age category or a gender category based on at least one of the first color data of the face region or the face shape in the face region.

An embodiment of operation 204 will be described below in detail with reference to FIGS. 11 to 14.

Referring to FIGS. 11 to 14, an embodiment will be described, in which the processor 120 corrects a correction target region in proportion to a probability value according to first skin probability data.

Figure 11:
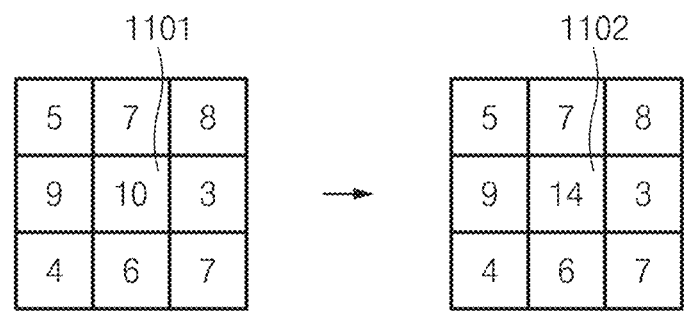
FIGS. 11 and 12 are diagrams illustrating correction of pixel luminance information according to first skin probability data according to an embodiment.
Figure 12:
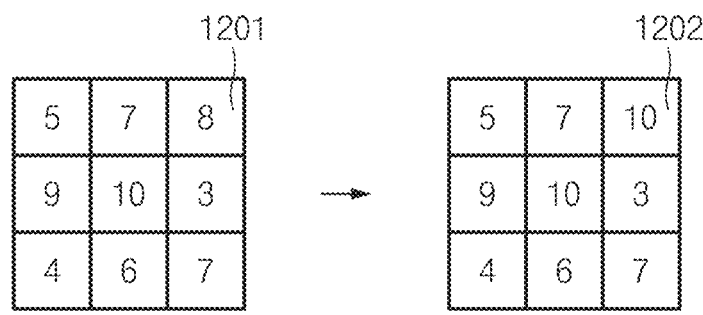

FIGS. 11 and 12 are diagrams illustrating that luminance information of a pixel is corrected according to first skin probability data according to an embodiment.

The embodiments of FIGS. 11 and 12 will be described under assumption that an increase in a Y value for correction of luminance information according to the correction data is 5, a probability value according to first skin probability data corresponding to center pixels 1101 and 1102 is 0.8, and a probability value according to first skin probability data corresponding to upper right pixels 1201 and 1202 is 0.4.

In one embodiment, when the processor 120 corrects the luminance information of the center pixel 1101 illustrated in the left side of FIG. 11, the processor 120 may add, to a Y value of the center pixel 1101, 4 which is acquired by multiplying 5 that is the increase in the Y value according to the correction data by a probability value 0.8 according to the first skin probability data. Accordingly, the Y value 10 of the center pixel 1101 may be converted to 14, which is the Y value of the center pixel 1102 illustrated in the right side of FIG. 11.

In one embodiment, when the processor 120 corrects a Y value of the upper right pixel 1201 illustrated in the left side of FIG. 12, the processor 120 may add, to the Y value of the upper right pixel 1201, 2 which is acquired by multiplying 5 that is the increase in the Y value according to the correction data by a probability value 0.4 according to the first skin probability data. Accordingly, the Y value 8 of the upper right pixel 1201 may be converted to 10, which is the Y value of the upper right pixel 1202 illustrated in the right side of FIG. 12.

Figure 13:
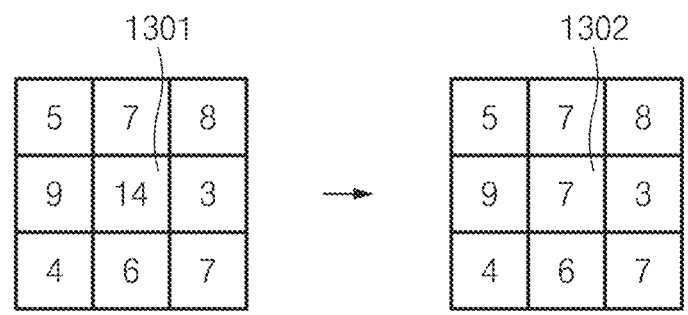
FIG. 13 is a view illustrating that a texture is corrected according to first skin probability data according to an embodiment.

FIG. 13 is a diagram illustrating that a texture is corrected according to first skin probability data according to an embodiment.

The embodiment of FIG. 13 will be described under the assumption that the number of neighboring pixels whose the Y values are acquired by the processor 120 to correct texture according to the correction data is 8.

In one embodiment, when the processor 120 corrects the texture of a center pixel 1301 illustrated in the left side of FIG. 13, the processor 120 may calculate, as a Y value of the center pixel 1301, 7 that is an average value of 14 that is the Y value of the center pixel 1301 and 5, 7, 8, 9, 3, 4, 6 and 7 that are the Y values of the neighboring pixels of the center pixel 1301.

The processor 120 may sequentially correct texture of a pixel located at the right side of the center pixel 1301 after correcting the texture of the center pixel 1301.

Figure 14:
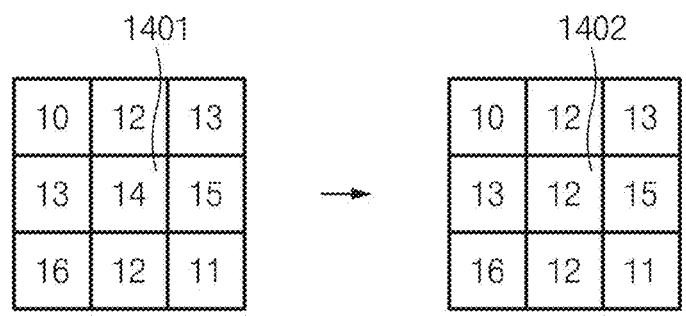
FIG. 14 is a diagram illustrating that chrominance information is corrected according to first skin probability data according to an embodiment.

FIG. 14 is a diagram illustrating that chrominance information is corrected according to first skin probability data according to an embodiment.

The embodiment of FIG. 14 will be described under the assumption that a decrease in a U value for correction of chrominance information between the luminance according to the correction data and a blue color is 4, and a probability value according to first skin probability data corresponding to center pixels 1401 and 1402 is 0.5.

In one embodiment, when the processor 120 corrects chrominance information between the luminance and the blue color of the center pixel 1401 illustrated in the left side of FIG. 14, the processor 120 may subtract, from a Y value of the center pixel 1401, 2 which is acquired by multiplying 4 that is the decrease in the Y value according to the correction data by a probability value 0.5 according to the first skin probability data. Accordingly, the U value 14 of the center pixel 1401 may be converted to 12, that is the U value of the center pixel 1402 illustrated in the right side of FIG. 14.

Hereinafter, a result of image correction according to one embodiment will be described with reference to FIGS. 15A and 15B.

Figure 15A:
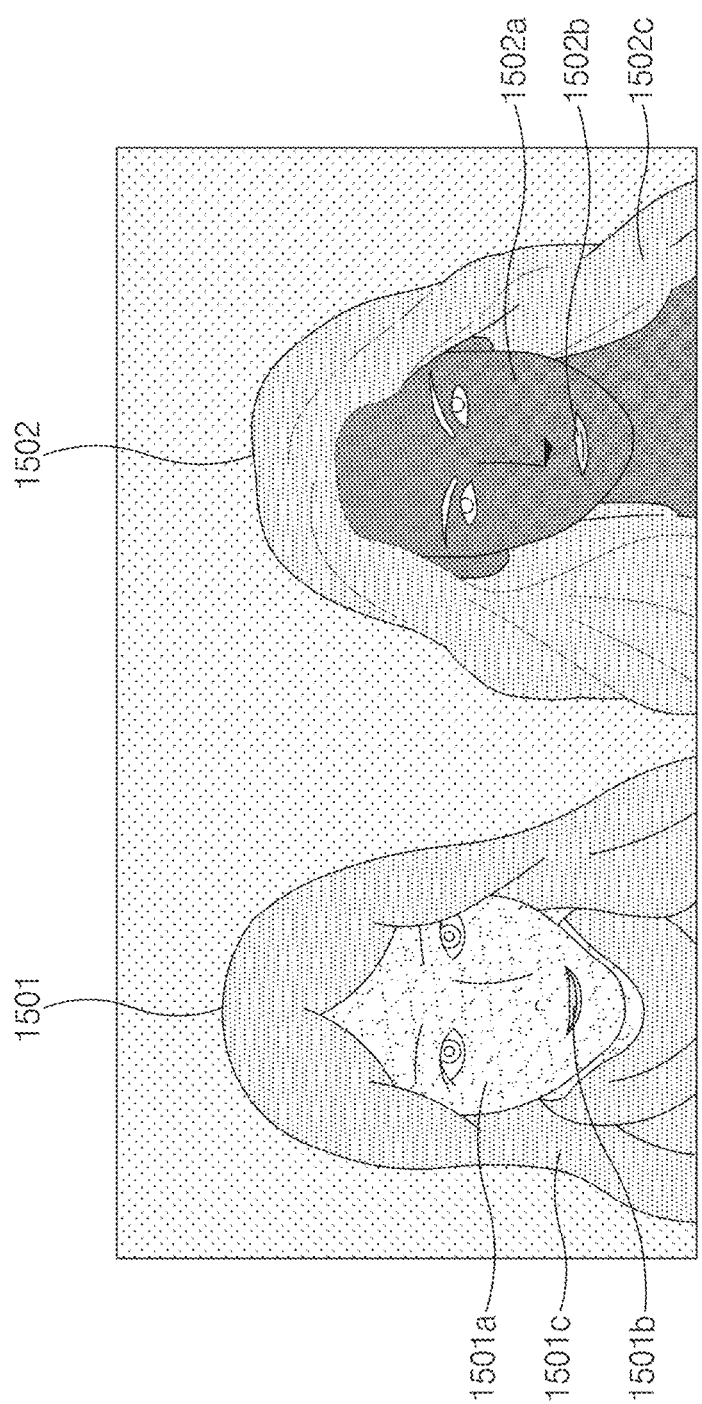
FIG. 15A is an original image including a face region for white people and a face region for black people according to an embodiment.

FIG. 15A illustrates an original image including a face region for white people and a face region for black people according to an embodiment. FIG. 15B is a corrected image including a face region for white people and a face region for black people according to an embodiment.

Figure 15B:
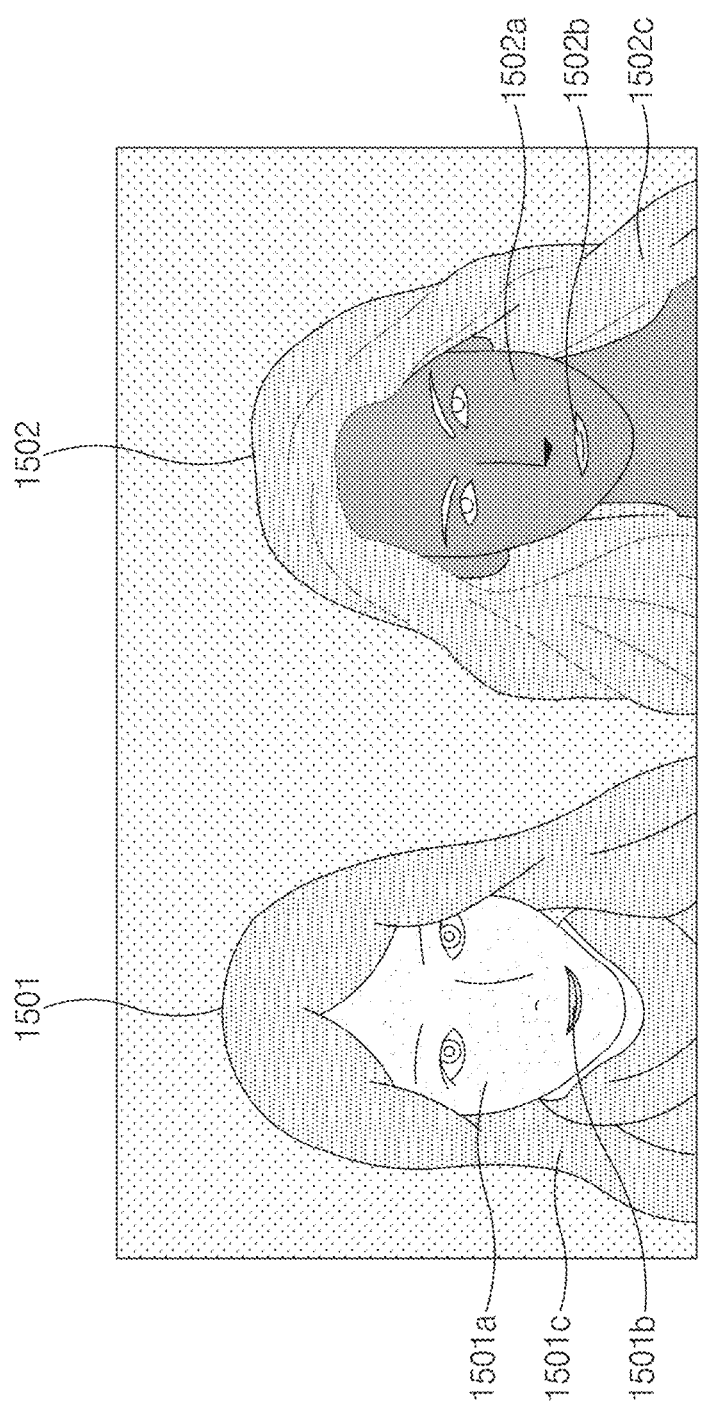
FIG. 15B is a corrected image including a face region for white people and a face region for black people according to an embodiment.

The embodiment will be described under the assumption that the skin colors of a first person 1501 and a second person 1502 illustrated in FIGS. 15A and 15B are different from each other.

When FIG. 15A is compared with FIG. 15B, the luminance of the skin region 1501a and 1502a of the first person 1501 and the second person 1502 may increase by image correction according to the embodiment. When FIG. 15A is again compared with FIG. 15B, it can be seen that the luminance or colors of lip areas 1501b and 1502b and hair regions 1501c and 1502c not skin are not changed unlike the skin regions 1501a and 1502a. In other words, one embodiment of the disclosure may correct skin colors in the image and may not correct colors of other objects than skin.

In addition, according to an embodiment, as illustrated in FIGS. 15A and 15B, a level of luminance correction of the skin region 1501a of the first person 1501 may be different from a level of luminance correction of the skin region 1502a of the second person 1502. In operation 203, the category corresponding to the first person 1501 determined by the processor 120 may be different from the category corresponding to the second person 1502. The correction data for correcting the skin region 1501a of the first person 1501 and the skin region 1501b of the second person 1502 which are used by the processor 120 in operation 204 may differ depending on the category, and the levels of luminance correction may be different from each other.

According to one embodiment, the processor 120 may recognize the face region in operation 201, but the processor 120 may determine whether a specified condition is satisfied (e.g., whether the face region actually includes a face) by using the first skin probability data acquired through operation 202. When the face region satisfies the specified condition, the processor 120 may correct a correction target region and when the face region does not include a face, the processor 120 may not correct the correction target region. In other words, by determining whether the face region includes a face, the accuracy of face region recognition may be increased, and operations 203 and 204 may not be performed for a region with no face.

Figure 16:
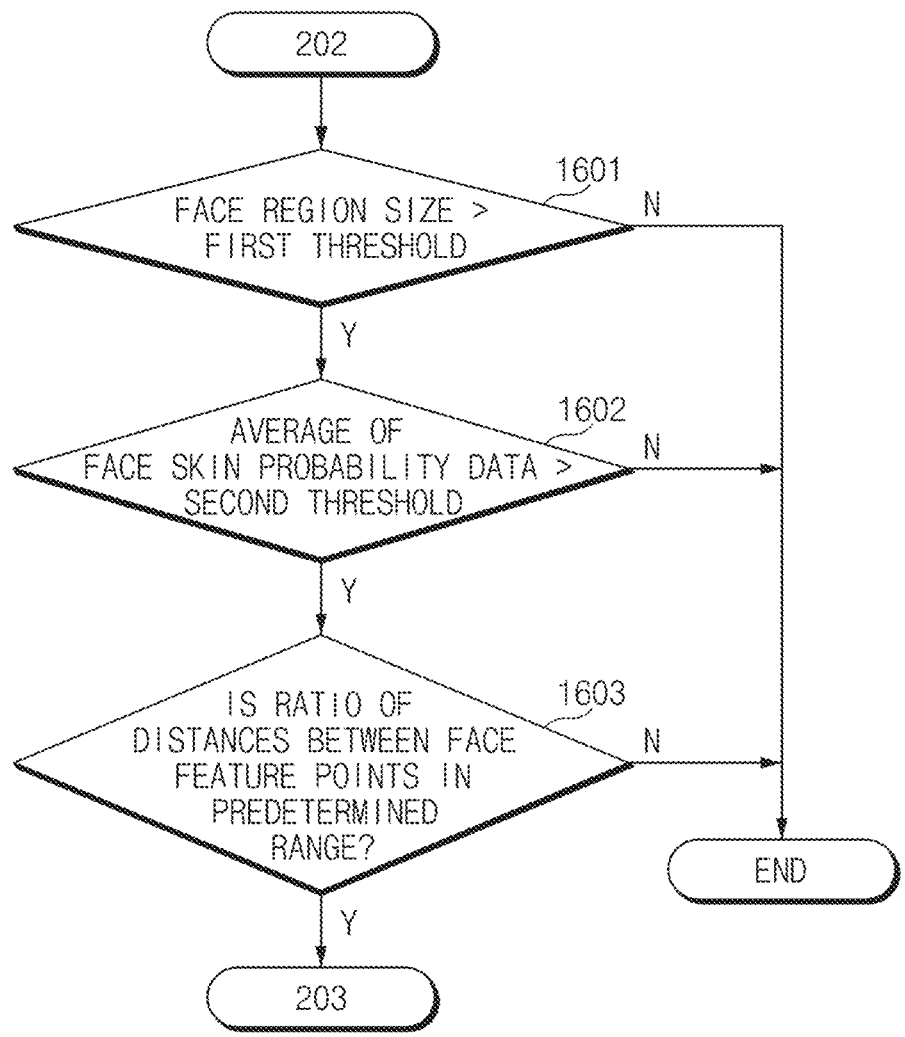
FIG. 16 is a flowchart illustrating a method for determining whether a face region according to an embodiment actually includes a face.

FIG. 16 is a flowchart illustrating a method for determining whether a face region actually includes a face, according to an embodiment.

In operation 1601, the processor 120 may determine whether the size of the face region is greater than a first threshold. When the size of the face region is less than the first threshold value, the processor 120 may determine that the face region does not satisfy a specified condition, and may not correct a correction target region. When the size of the face region is greater than the first threshold value, the processor 120 may determine that the face region satisfies the specified condition and perform operation 1602.

In operation 1602, the processor 120 may determine whether an average of probability values of regions according to the first skin probability data is greater than a second threshold value. For example, when an average of probability values according to the first skin probability data corresponding to pixels over a certain amount (e.g., a specified number, a specified area, or the like) in the face region is less than the second threshold value, the processor 120 may determine that the specified condition is not satisfied and may not correct the correction target region. When the average of the probability values according to the first skin probability data is less than the second threshold value, the processor 120 may determine that the face region satisfies the specified condition and perform operation 1603.

In operation 1603, the processor 120 may determine whether a ratio of distances between feature points included in the face region is in a predetermined range. For example, the feature points of the facial region may correspond to points such as the eyes, nose, or mouth of the face. When the ratio of the distances between the feature points is not in a range of the ratio of the distances between the eyes, the nose and the mouth of a general person, it may be determined that the face region does not include a face.

When the ratio of distances between the feature points included in the face region is not in the predetermined range, the processor 120 may determine that the face region does not satisfy the specified condition, and may not correct the correction target region. When the ratio of the distances between the feature points included in the face region is in the predetermined range, the processor 120 may determine that the face region satisfies the specified condition and perform operation 203.

According to one embodiment, each of operations 1601 to 1603 described above may be an operation for determining whether or not the face region actually includes a face. Each of the operations 1601 to 1603 may be performed in parallel, and only some of the operations 1601 to 1603 may be performed.

It should be understood that the various embodiments of the disclosure and the terminology used herein are not intended to limit the techniques described herein to specific embodiments, but rather to include various modifications, equivalents, and/or alternatives of the embodiments. With regard to description of drawings, similar components may be marked by similar reference numerals. As used herein, singular forms may include plural forms as well unless the context clearly indicates otherwise. In the disclosure, the expressions "A or B", "at least one of A or/and B", "A, B or C", "at least one of A, B and/or C", and the like may include any and all combinations of one or more of the associated listed items. The terms, such as "first", "second" and the like used in the disclosure may be used to refer to various components regardless of the order and/or the priority and to distinguish the relevant components from other components, but do not limit the components. It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present.

According to the situation, the expression "adapted to or configured to" used herein may be used interchangeably with, for example, the expressions "suitable for", "having the capacity to", "designed to", "adapted to", "made to", or "capable of". The expression "a device configured to" may mean that the device is "capable of" operating together with another device or other components. For example, a "processor configured to (or adapted to) perform A, B, and C" may mean a dedicated processor (e.g., an embedded processor) for performing corresponding operations or a generic-purpose processor (e.g., a central processing unit (CPU) or an application processor (AP)) which may perform corresponding operations by executing one or more programs which are stored in a memory device (e.g., the memory 130).

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 130) in the form of a program module. The instruction, when executed by a processor (e.g., the processor 120), may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an internal memory, or the like. The instruction may contain a code made by a compiler or a code executable by an interpreter.

Each of components (e.g., modules or program module) according to various embodiments may be comprised of one or a plurality of entities, and some subcomponents of the subcomponents described above may be omitted, or other subcomponents may be further included. Alternatively or additionally, some components (e.g., modules or program modules) may be integrated into one entity to perform the same or similar functions as those performed by respective components prior to integration. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

What is claimed is:

1. An electronic device comprising:
a memory; and
a processor electrically connected to the memory, wherein the processor is configured to:
recognize a face region in an image,
acquire first skin probability data corresponding to a correction target region, based on first skin color distribution including skin color distributions stored in association with a plurality of races, a first color data of the face region, and a second color data of the correction target region including the face region in the image,
determine a category of the face region based on the first color data of the face region,
correct a color of the correction target region based on the determined category and the first skin probability data,
acquire second skin probability data corresponding to the face region based on the first skin color distribution and the first color data of the face region,
generate a second skin color distribution based on the second skin probability data and the first color data of the face region, and
identify the first skin probability data of the correction target region based on the second skin color distribution and the second color data of the correction target region,
wherein the first skin probability data comprises a probability that the color of the face region included in the correction target region is a skin color such that a probability value according to the first skin probability data of each pixel of the face region represents a degree indicating similarity of a color of each pixel of the face region to the skin color,
wherein the second skin probability data indicates a probability value of a color of each region included in the face region is the skin color, and
wherein, as the probability value according to the second skin probability data of each region increases, a degree of similarity to a skin color distribution increases.

2. The electronic device of claim 1, wherein the processor is further configured to generate the second skin color distribution using at least one of luminance information or chrominance information of a region of the face region, the region having a probability value according to the second skin probability data is equal to or greater than a predetermined value.

3. The electronic device of claim 1, wherein the processor is further configured to determine a correction level of the correction target region based on a probability value according to the first skin probability data.

4. The electronic device of claim 1, wherein the processor is further configured to correct at least one of luminance information, texture, or chrominance information of the correction target region.

5. The electronic device of claim 1, wherein the processor is further configured to determine at least one of a race, an age, or a gender as at least a part of the category, based on the image.

6. The electronic device of claim 5, wherein the processor is further configured to determine the category further based on a face shape included in the face region.

7. The electronic device of claim 1, wherein the processor is further configured to:
determine whether the recognized face region satisfies a specified condition using the first skin probability data,
correct the correction target region when the face region satisfies the specified condition, and
not correct the correction target region when the face region does not satisfy the specified condition.

8. The electronic device of claim 7, wherein the processor is further configured to determine whether the specified condition is satisfied based on at least one of a size of the face region, an average of probability values of regions according to the first skin probability data or positions of feature points included in the face region.

9. The electronic device of claim 1, wherein the processor is further configured to receive the first skin color distribution from an external device.

10. An electronic device comprising:
a memory; and
a processor,
wherein the processor is configured to:
acquire an image for a plurality of external objects,
recognize a face region corresponding to a face among the plurality of external objects, based on the image,
determine a first probability to correspond to skin for at least a part of the face region based on a first skin color data corresponding to the face region,
determine a correction target region including the face and an external object related to the face of the plurality of external objects,
determine a second probability to correspond to skin for at least a part of the correction target region based on the first probability,
perform correction on the at least a part with a first level when the second probability corresponds to a first value and preform correction on the at least a part with a second level when the second probability corresponds to a second value,
determine a degree of skin similarity corresponding to the face region using at least the first skin color data as at least a part of an operation of the determining of the first probability, and
determine the first probability using at least the skin similarity,
wherein the first probability comprises a probability that color of the face region included in the correction target region is a skin color such that a probability value according to the first probability of each pixel of the face region represents a degree indicating similarity of a color of each pixel of the face region to the skin color,
wherein the second probability indicates a probability value of a color of each region included in the face region is the skin color, and
wherein, as the probability value according to the second probability of each region increases, a degree of similarity to a skin color distribution increases.

11. The electronic device of claim 10, wherein the processor is further configured to correct at least one of luminance information, texture, or chrominance information of the at least a part, as a part of an operation of the performing of the correction.

12. The electronic device of claim 10, wherein the processor is further configured to:
determine a category of the face region related to at least one of a race, an age or a gender, based on the image, and
determine a feature of the correction based on the determined category.

13. The electronic device of claim 10, wherein the processor is further configured to:
determine whether the recognized face region satisfies a specified condition using the second probability,
perform the correction when the face region satisfies the specified condition, and not perform the correction when the face region does not satisfy the specified condition.

14. The electronic device of claim 1, wherein the second skin probability data include the probability value for each pixel included in the face region designated as a Y value, a U value and a V value.

15. The electronic device of claim 1, wherein the second skin probability data is defined as a distribution of probability values of each region including a plurality of pixels.

* * * * *